(12) United States Patent
Correia et al.

(10) Patent No.: US 9,572,022 B2
(45) Date of Patent: Feb. 14, 2017

(54) RESOLVING IP ADDRESSES IN A WIRELESS ENVIRONMENT

(75) Inventors: John J. Correia, Livonia, MI (US); Ki Hak Yi, Windsor (CA)

(73) Assignee: General Motors LLC, Detroit, MI (US)

(*) Notice: Subject to any disclaimer, the term of this patent is extended or adjusted under 35 U.S.C. 154(b) by 93 days.

(21) Appl. No.: 13/494,551

(22) Filed: Jun. 12, 2012
(Under 37 CFR 1.47)

(65) Prior Publication Data
US 2013/0329634 A1   Dec. 12, 2013

(51) Int. Cl.
  *H04W 4/00*   (2009.01)
  *H04W 8/26*   (2009.01)
  *H04W 4/02*   (2009.01)
  *H04L 29/12*  (2006.01)

(52) U.S. Cl.
  CPC .......... *H04W 8/26* (2013.01); *H04L 61/1511* (2013.01); *H04L 61/609* (2013.01); *H04W 4/021* (2013.01); *H04L 61/2038* (2013.01); *H04L 61/2076* (2013.01)

(58) Field of Classification Search
  CPC ........ H04W 88/06; H04W 36/32; H04W 4/18; H04W 76/025; H04W 8/26; H04W 4/00
  See application file for complete search history.

(56) References Cited

U.S. PATENT DOCUMENTS

| | | | | |
|---|---|---|---|---|
| 2004/0194102 | A1* | 9/2004 | Neerdaels | 718/100 |
| 2008/0102854 | A1* | 5/2008 | Yi et al. | 455/456.1 |
| 2010/0279665 | A1* | 11/2010 | Hardin et al. | 455/414.1 |
| 2010/0296441 | A1* | 11/2010 | Barkan | 370/328 |
| 2010/0312646 | A1* | 12/2010 | Gupta et al. | 705/14.58 |

* cited by examiner

*Primary Examiner* — Chi H Pham
*Assistant Examiner* — Raul Rivas
(74) *Attorney, Agent, or Firm* — Christopher DeVries; Reising Ethington P.C.

(57) ABSTRACT

A method of anonymously resolving Internet Protocol (IP) addresses using a distributed network includes defining a virtual geographic area that comprises a micro dynamic domain name server (MDDNS); wirelessly receiving at a central facility a geographic attribute of a telematics unit; determining at the central facility that the telematics unit is within the virtual geographic area using the received geographic attribute; and transmitting an IP address of a host telematics unit in the MDDNS to the telematics unit.

20 Claims, 2 Drawing Sheets

RESOLVING IP ADDRESSES IN A WIRELESS ENVIRONMENT

TECHNICAL FIELD

The present disclosure relates generally to wireless communications and more particularly to resolving Internet Protocol (IP) addresses in a wireless environment.

BACKGROUND

A large number of electronic devices communicate information via packetized data. This data may be sent and received using IP addresses that are assigned to the electronic devices and route packetized data. An IP address can be assigned to an electronic device and to send it data, the IP address can be resolved by a domain name server that correlates the name of the device with its assigned IP address. While the domain name server is typically thought of as resolving domain names into IP addresses, this type of server can also resolve other identifiers/names into IP addresses as well. For instance, an email address or telephone number can be resolved into an IP address using the domain name server model. IP addresses can be assigned to electronic devices both statically and dynamically. But regardless of whether the IP address is assigned statically or dynamically, a number of challenges exist with regard to domain name servers. For instance, assigning static IP addresses can be an inefficient use of available IP addresses because a device having a statically-assigned IP address may only actively use that IP address for a fraction of each day thereby wasting the use of that IP address for the remainder of the day. Similarly, dynamically assigning IP addresses calls for maintaining a dynamic domain name server that updates a domain name with a current IP address each time the IP address is dynamically assigned. Maintaining such a server can involve significant computer processing requirements.

Electronic devices are more frequently equipped with the capability to communicate wirelessly and as a result can be mobile. As the electronic devices move from one place to another, it can be difficult to maintain a centralized domain name server that can resolve IP addresses for these devices. This is especially true when mobile electronic devices include position-determining capabilities.

SUMMARY

According to an aspect of the invention, there is provided a method of anonymously resolving Internet Protocol (IP) addresses using a distributed network. The steps include defining a virtual geographic area that comprises a micro dynamic domain name server (MDDNS); wirelessly receiving at a central facility a geographic attribute of a wireless device; determining at the central facility that the wireless device is within the virtual geographic area using the received geographic attribute; and transmitting an IP address of a host wireless device in the MDDNS to the wireless device.

According to another aspect of the invention, there is provided a method of anonymously resolving Internet Protocol (IP) addresses using a distributed network. The steps include defining a plurality of virtual geographic areas each associated with a micro dynamic domain name server (MDDNS); receiving at a central facility a geographic attribute of a vehicle telematics unit; identifying a virtual geographic area that includes the received geographic attribute among the defined plurality of virtual geographic areas; determining an IP address of a host vehicle telematics unit of the MDDNS associated with the identified virtual geographic area; transmitting the determined IP address of the host vehicle telematics unit to the vehicle telematics unit; and wirelessly receiving one or more IP addresses from the host vehicle telematics unit of the MDDNS using an IP address assigned to the vehicle telematics unit.

According to yet another aspect of the invention, there is provided a method of anonymously resolving Internet Protocol (IP) addresses using a distributed network. The steps include receiving an IP address at a vehicle via a wireless carrier system; determining the location of the vehicle; identifying a first virtual geographic area comprising a micro dynamic domain name server (MDDNS) based on the determined location of the vehicle; registering the received IP address with the MDDNS; receiving at the vehicle one or more IP addresses assigned to other vehicles in the MDDNS; detecting the departure of the vehicle from the first virtual geographic area and the entry of the vehicle into a second virtual geographic area comprising a second MDDNS; registering the received IP address with the second MDDNS; and receiving at the vehicle one or more IP addresses assigned to other vehicles in the second MDDNS.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
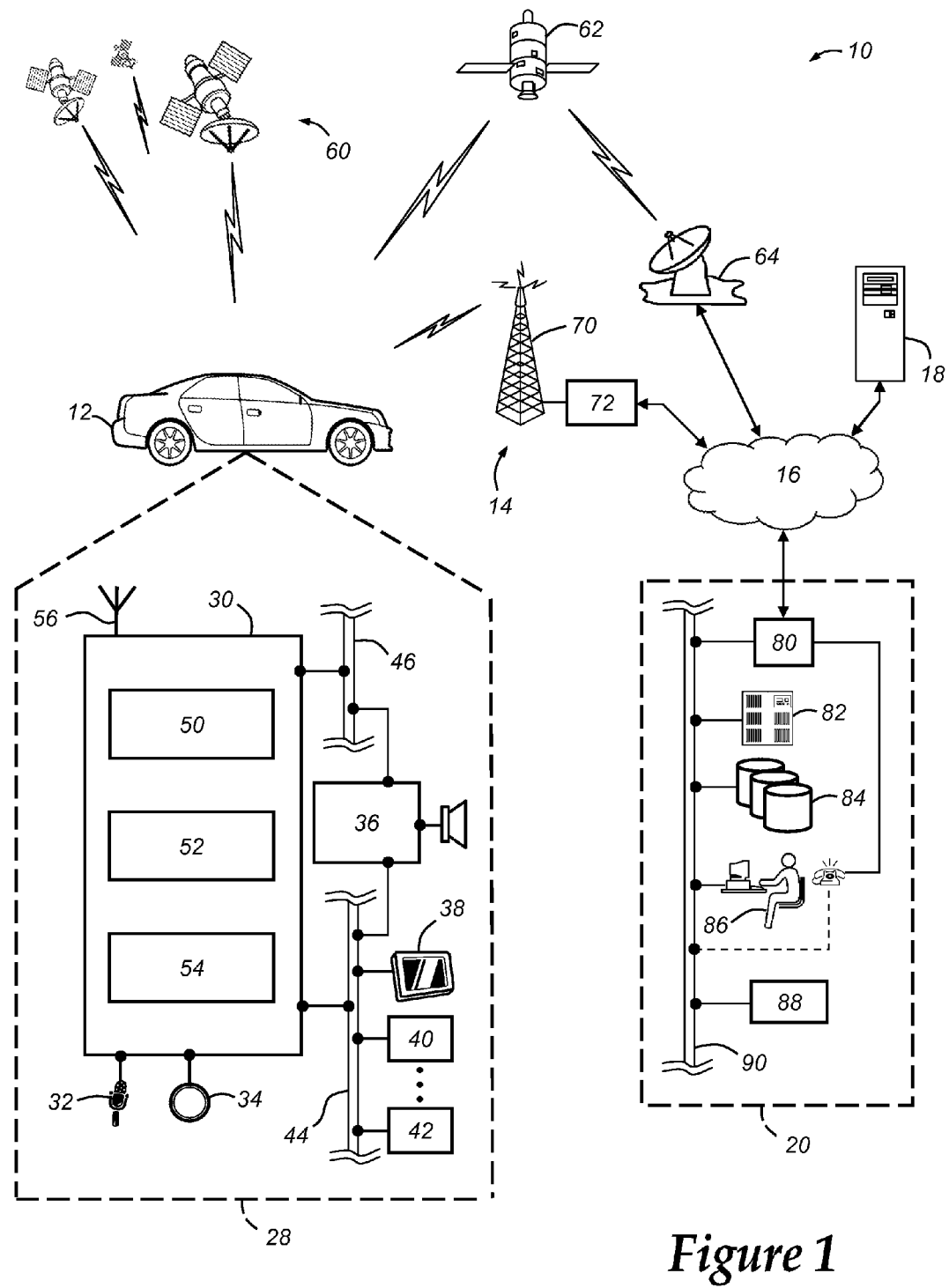
FIG. 1 is a block diagram depicting an exemplary embodiment of a communications system that is capable of using the method disclosed herein.

The method described below anonymously resolves Internet Protocol (IP) addresses using a distributed network. Instead of solely implementing a centralized dynamic domain name server (CDDNS) to resolve IP addresses assigned to wireless devices, it is possible to distribute domain name resolution at least partially among a large number of individual micro domain name servers (MDDNS) that can be widely dispersed geographically. This way, a plurality of MDDNSs can each include a group of wireless devices, such as vehicle telematics units, of which one can be a host wireless device that acts as the host server for the MDDNS. The host wireless device can maintain an MDDNS list of all of the wireless devices in the MDDNS as well as their respective IP addresses and resolve IP address requests for the wireless devices in the MDDNS. As part of acting as the host server for the MDDNS, the host wireless device can provide its IP address to a central facility and/or the CDDNS and requests to resolve IP addresses can be directed to the MDDNS using the IP address of the host wireless device. Thus, the CDDNS may track only the IP address of the host wireless device in the MDDNS rather than each of the IP addresses in the MDDNS. As a result, the CDDNS can be implemented in a simpler, more reliable, and cost-effective way.

While the host wireless device can maintain the MDDNS list, each of the other wireless devices in the MDDNS can maintain the MDDNS list as well. This can be carried out using peer-to-peer (P2P) computing techniques in which each wireless device in the MDDNS shares a number of tasks, such as the burden of maintaining the MDDNS list. Using the P2P techniques, the wireless devices can make up a distributed database of IP addresses. When the MDDNS list is maintained by each of the wireless devices in the MDDNS, the departure of the host wireless device from the MDDNS can be addressed by designating another wireless device in the MDDNS as the new host wireless device. At that time, the host wireless device can inform other wireless devices in the MDDNS of its departure and another wireless device in the MDDNS can then be designated as the new host wireless device. Given that each of the wireless devices in the MDDNS can maintain the MDDNS list, each wireless device can be selected to act as the new host wireless device thereby easing the departure of the most recent host wireless device. By decentralizing the resolution of IP addresses assigned to wireless devices included in the MDDNSs and sharing the MDDNS list among more than one wireless device in the MDDNS, the present method can use a distributed database to update and/or resolve IP addresses.

In addition to updating and resolving IP addresses, the central facility can identify the MDDNS based on geographic attributes. Using the location of the MDDNS, the central facility and/or other wireless devices can access information from and/or communicate with wireless devices in the MDDN. For instance, the MDDNS can be defined by a virtual geographic area, such by geofencing, and the population of wireless devices within the geographic area may be categorized by the location of the wireless devices. As a wireless device enters the geographic area of the MDDNS, that wireless device can send its IP address to the host of the MDDNS and in return receive the MDDNS list from the host wireless device. The IP address of the host wireless device along with the location of the MDDNS or host wireless device can be known by the central facility. Given the location of the MDDNS and the IP address of the host wireless device, the central facility can locate and contact wireless devices in the MDDNS. Repeating this arrangement across a large geographic area, it is possible to identify a geographic area and obtain information about that area from the MDDNS.

This can be helpful in a number of situations, such as when a vehicle is stopped in traffic along a roadway and the cause of this stoppage is unknown. In this case, the vehicle stopped in traffic could want to see the roadway at a particular location (e.g. five miles down the road). The vehicle telematics device of the vehicle can contact the central facility with the particular location, the central facility can then identify the MDDNS at the particular location, provide the requesting vehicle the IP address of the host of the MDDNS at the particular location, and the vehicle can request information relating to the stoppage from the host of the MDDNS using the IP address. This information can include vehicle speed of one or more vehicles in the MDDNS at the particular location, access to images from an in-vehicle camera, or other such information that can be provided as packetized data. It may also be possible to send messages and receive responses to the sent messages from the MDDNS at the particular location. And while the vehicle in this example can receive information from vehicles in the MDDNS at the particular location, the vehicle may not know the identity of the vehicle(s) that are providing such information.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions.

Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services by the CDDNS or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead use VRS 88 as an automated advisor or, a combination of VRS 88 and the live advisor 86 can be used.

Figure 2:
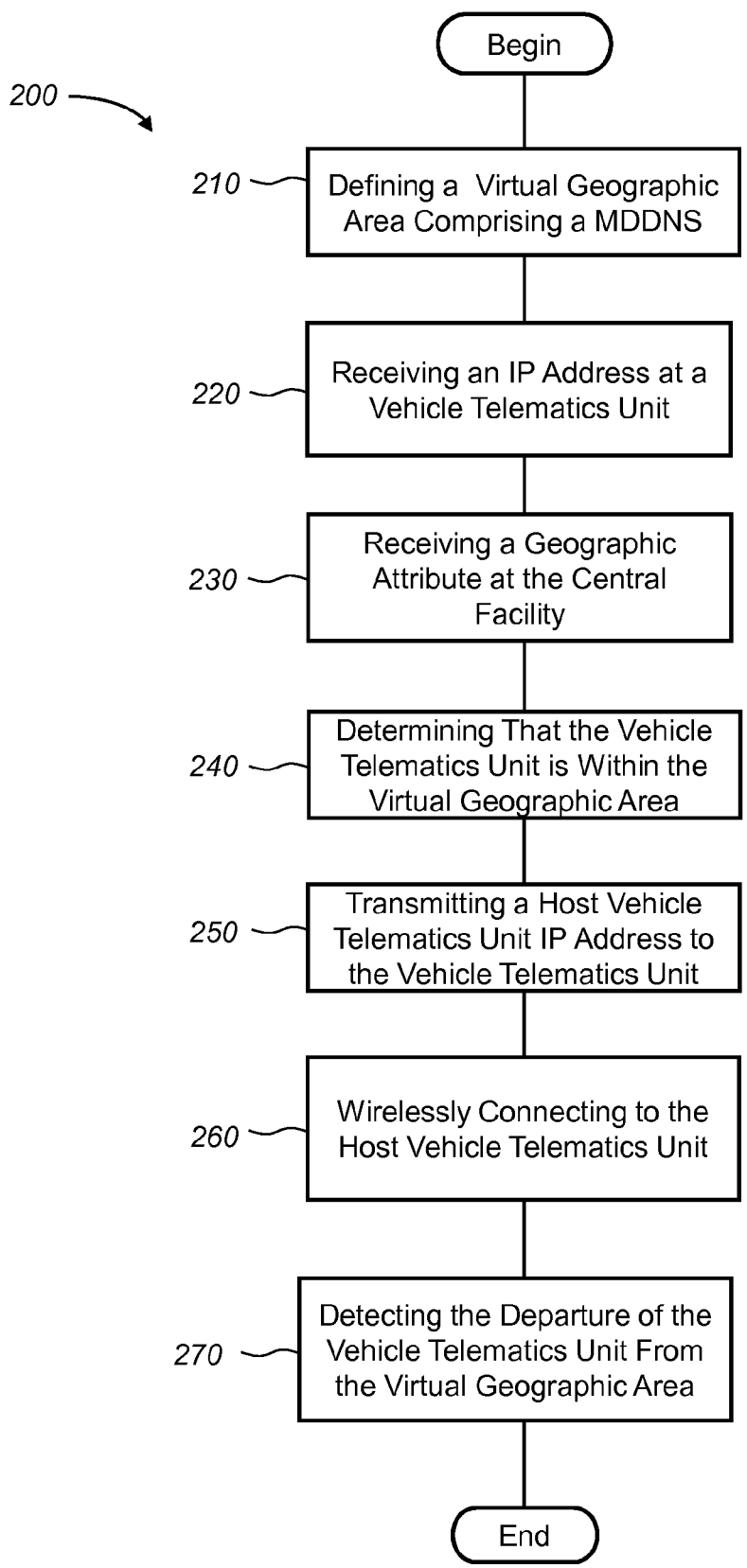
FIG. 2 is a flow chart of a method of anonymously resolving Internet Protocol IP addresses using a distributed network.

Turning now to FIG. 2, there is a method 200 of anonymously resolving Internet Protocol (IP) addresses using a distributed network. The method 200 begins at step 210 by defining a virtual geographic area that comprises a micro dynamic domain name server (MDDNS). The virtual geographic area can be defined at or by the central facility, such as a call center 20 or in a service center represented by computer 18. The virtual geographic area can be described using latitude and longitude coordinates that define a virtual perimeter around a defined geographic area and can be established much like a geofence. Using a plurality of latitude/longitude coordinate pairs, the virtual geographic area can be geographically defined and used to monitor the population of vehicle telematics units 30 within the boundary of the virtual geographic area. The term "monitor" can include activities such as maintaining the ability to resolve the IP address of a vehicle telematics unit 30 within the virtual geographic area through a host wireless device (in this implementation, a host vehicle telematics unit 30) as well as maintaining the ability to geographically locate the vehicle telematics unit 30 within the virtual geographic area or MDDNS based on the location of the virtual geographic area. While what follows is described with respect to vehicle telematics units 30 or host vehicle telematics units 30, it is also possible to carry out this system/method using other wireless devices and host wireless devices, such as commonly-available smartphones that are known to those skilled in the art. Vehicles 12 carrying vehicle telematics units 30 can be a part of an MDDNS if the vehicle 12 is located within the virtual geographic area.

Depending on the implementation, the virtual geographic area can be either fixed with respect to geographic reference points or can move along with one or more vehicles 12. In the former case, the virtual geographic area can be defined by a plurality of latitude and longitude coordinates that are fixed about some land-based reference point. In one example, the fixed virtual geographic area is a point of interest, such as a football stadium or a national/state park or recreation area. With regard to a moving virtual geographic area, a plurality of vehicles 12 and vehicle telematics units 30 can move along a public road. Regardless of whether the vehicle occupants plan to move their vehicles 12 in concert or coordination, vehicles 12 may nonetheless move together for a period of time. In one example, a plurality of vehicles 12 may move from Detroit, Mich. to Mackinac City, Mich. along a section of Interstate I-75. As the plurality of vehicles 12 travels along the section of I-75, the virtual geographic area surrounding the vehicles 12 along with the MDDNS—can move as well. While the virtual geographic area has been described individually, it should be appreciated that large number of virtual geographic areas/MDDNSs can exist simultaneously. For instance, it is possible that the number of virtual geographic areas can number in the millions. The method 200 proceeds to step 220.

At step 220, an IP address is received at the vehicle 12 or vehicle telematics unit 30 from the wireless carrier system 14. When the vehicle occupant activates the ignition switch of the vehicle 12, the telematics unit 30 can obtain an IP address from the wireless carrier system 14. In one example, the vehicle telematics unit 30 detects a base transceiver station belonging to the wireless carrier system 14 (e.g. cell tower 70), and as part of registering with that station, requests an IP address. The wireless carrier system 14 can, as part of the registration process, assign the vehicle telematics unit 30 an IP address for carrying out packetized data transmissions to and from the vehicle telematics unit 30. The packetized data sent/received by the vehicle telematics unit 30 can be used to carry out a variety of activities, such as supporting voice conversations using VOIP or communicating vehicle data gathered by the unit 30 via the vehicle bus 44. The method 200 proceeds to step 230.

At step 230, a geographic attribute of a vehicle telematics unit is received at the central facility. For instance, the geographic attribute can be the determined location of a vehicle 12. In one implementation, the vehicle 12 can determine its location using the GPS module 40 and send the determined location to the central facility, such as call center 20. While the geographic attribute can be sent as packetized data using the IP address assigned to the vehicle telematics unit 30, it is also possible to send the geographic attribute to the central facility via a circuit-switched telephone call as well. In some cases, the vehicle telematics unit 30 can send its assigned IP address to the central facility along with the geographic attribute. The method 200 proceeds to step 240.

At step 240, the vehicle telematics unit 30 is determined to be within the virtual geographic area using the received geographic attribute. This can be carried out at the central facility (e.g. call center 20) or computer 18 discussed above. In one example, determining that the vehicle telematics unit 30 is within the virtual geographic area includes comparing the geographic attribute (in this case, the location of the vehicle 12) with the boundaries of one or more virtual geographic areas. If the geographic attribute indicates that the vehicle 12 and/or vehicle telematics unit 30 is located within the virtual geographic area, then the MDDNS for that virtual geographic area can be assigned to the vehicle 12/vehicle telematics unit 30. Put differently, the MDDNS for the virtual geographic area surrounding the vehicle 12 can be identified and its identity conveyed to the vehicle 12 and/or vehicle telematics unit 30. The method 200 proceeds to step 250.

At step 250, an IP address of a host vehicle telematics unit 30 in the MDDNS associated with the identified virtual geographic area is determined and transmitted to the vehicle telematics unit 30. After the virtual geographic area/MDDNS for the vehicle 12/vehicle telematics unit 30 is selected, the IP address for the host vehicle telematics unit 30 belonging to the selected MDDNS can be sent from the central facility to the vehicle telematics unit 30. The host vehicle telematics unit 30 can be structurally indistinct from other vehicle telematics units 30. However, the IP address assigned to the host vehicle telematics unit 30 can be used as a contact node for the MDDNS. And the central facility can maintain a list of IP addresses each of which belonging to a host vehicle telematics unit 30 for each MDDNS. The central facility, in this implementation, can be carried out using computer 18. For example, once a virtual geographic area surrounding the vehicle 12 has been identified, the vehicle telematics unit 30 can join the MDDNS of the area by contacting the MDDNS using the IP address of the host vehicle telematics unit 30. The method 200 proceeds to step 260.

At step 260, the vehicle telematics unit 30 wirelessly connects to the host vehicle telematics unit 30 in the MDDNS using the transmitted IP address and receives one or more IP addresses from the host vehicle telematics unit 30 in the MDDNS. Using the MDDNS described herein, it is possible to maintain an MDDNS list as a data file that includes the IP addresses for each vehicle telematics unit 30 in the MDDNS thereby allowing each vehicle telematics unit 30 to contact each other using those IP addresses. When the vehicle telematics unit 30 wirelessly connects to the host vehicle telematics unit 30 via the IP address of the host, the MDDNS list including the IP addresses can then be sent to the vehicle telematics unit 30 joining the MDDNS. Once the MDDNS list including the IP addresses of each vehicle telematics unit 30 in the MDDNS is received at the vehicle telematics unit 30 joining the MDDNS, the MDDNS list can be maintained such that when IP addresses for vehicle telematics units 30 in the MDDNS change or when vehicles 12/vehicle telematics units 30 join or leave the MDDNS, the MDDNS list can be updated to reflect this. And while the host vehicle telematics unit 30 may be the contact node for vehicle telematics units 30 joining the MDDNS, each vehicle telematics unit 30 can include the same updated MDDNS list. Thus, if at any point the host vehicle telematics unit 30 leaves the MDDNS, the status of host can be transferred to another vehicle telematics unit 30 in the MDDNS, which can carry out the hosting duties without interruption. An example of this transfer will be discussed below. The method 200 proceeds to step 270.

At step 270, the departure of the vehicle 12/vehicle telematics unit 30 from a first virtual geographic area and the entry of the vehicle 12/vehicle telematics unit 30 into a second virtual geographic area comprising a second MDDNS are detected. As the vehicle 12 or vehicle telematics unit 30 leaves one virtual geographic area and enters another geographic area/MDDNS, the MDDNS in each area can be informed of this status change. For instance, the vehicle 12 can leave the first virtual geographic area when the GPS module 40 of the vehicle 12 detects that the vehicle 12 has moved beyond a boundary defined by latitude/longitude coordinates of the first virtual geographic area. When it has been determined that the vehicle 12 has moved outside of the first virtual geographic area, the vehicle telematics unit 30 can transmit the geographic attribute, such as the position of the vehicle 12, to the central facility and the second virtual geographic area/second MDDNS can be identified. The IP address of the host vehicle telematics unit 30 for the second MDDNS can then be sent to the vehicle telematics unit 30. Using the IP address of the host vehicle telematics unit 30 for the first MDDNS, the vehicle telematics unit 30 leaving the first MDDNS can inform the host that the vehicle telematics unit 30 is leaving the first MDDNS. As a result, the host vehicle telematics unit 30 of the first MDDNS can direct the other vehicle telematics units 30 in the first MDDNS to update their MDDNS lists to remove the vehicle telematics unit 30 that is leaving. In addition, the vehicle telematics unit 30 leaving the first MDDNS can contact the host vehicle telematics unit 30 of the second MDDNS in order to join the second MDDNS, much like is done during step 260. The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of anonymously resolving Internet Protocol (IP) addresses using a distributed network, comprising the steps of:
   (a) defining a virtual geographic area that comprises a micro dynamic domain name server (MDDNS), wherein within the virtual geographic area a host wireless device resolves IP addresses for one or more wireless devices also within the virtual geographic area;
   (b) wirelessly receiving at a central facility a geographic attribute of a wireless device;
   (c) determining at the central facility that the wireless device is within the virtual geographic area using the received geographic attribute; and
   (d) transmitting an IP address of the host wireless device in the MDDNS to the wireless device.

2. The method of claim 1, further comprising the step of establishing a wireless connection between the wireless device and the host wireless device using the transmitted IP address.

3. The method of claim 1, further comprising the step of defining the virtual geographic area using two or more latitude and longitude coordinates.

4. The method of claim 1, further comprising the step of defining the virtual geographic area at the central facility.

5. The method of claim 1, further comprising the step of monitoring a population of wireless devices within the virtual geographic area.

6. The method of claim 1, further comprising the step of moving the virtual geographic area with respect to one or more wireless devices in the MDDNS.

7. The method of claim 1, further comprising the step of receiving the geographic attribute at the central facility along with an IP address assigned to the wireless device.

8. The method of claim 1, wherein the wireless device comprises a vehicle telematics unit and the host wireless device comprises a host vehicle telematics unit.

9. The method of claim 1, further comprising the step of resolving an IP address request using a central dynamic domain name server (CDDNS) that maintains the IP address of the host wireless device.

10. The method of claim 1, further comprising the steps of:
    detecting the departure of the wireless device from the virtual geographic area and the entry of the wireless device into a second virtual geographic area comprising a second MDDNS;
    registering an IP address assigned to the wireless device with the second MDDNS; and
    receiving at the wireless device one or more IP addresses assigned to other wireless devices in the second MDDNS.

11. A method of anonymously resolving Internet Protocol (IP) addresses using a distributed network, comprising the steps of:
    (a) defining a plurality of virtual geographic areas each associated with a micro dynamic domain name server (MDDNS), wherein each virtual geographic area includes a host vehicle telematics unit that resolves IP addresses for one or more vehicle telematics units;
    (b) receiving at a central facility a geographic attribute of a vehicle telematics unit;
    (c) identifying a virtual geographic area that includes the received geographic attribute among the defined plurality of virtual geographic areas;
    (d) determining an IP address of the host vehicle telematics unit of the MDDNS associated with the identified virtual geographic area;
    (e) transmitting the determined IP address of the host vehicle telematics unit to the vehicle telematics unit; and
    (f) wirelessly receiving one or more IP addresses from the host vehicle telematics unit of the MDDNS using an IP address assigned to the vehicle telematics unit.

12. The method of claim 11, further comprising the step of establishing a wireless connection between the vehicle telematics unit and the host vehicle telematics unit using the transmitted IP address.

13. The method of claim 11, further comprising the step of defining the plurality of virtual geographic areas using latitude and longitude coordinates for each virtual geographic area.

14. The method of claim 11, further comprising the step of defining the plurality of virtual geographic areas at the central facility.

15. The method of claim 11, further comprising the step of monitoring a population of vehicle telematics units within the plurality of virtual geographic areas.

16. The method of claim 11, further comprising the step of moving the plurality of virtual geographic areas with respect to one or more vehicle telematics units in each virtual geographic area.

17. The method of claim 11, further comprising the step of resolving an IP address request using a central dynamic domain name server (CDDNS) that maintains the IP address of the host vehicle telematics unit.

18. The method of claim 11, further comprising the steps of:
   detecting the departure of the vehicle telematics unit from the virtual geographic area and the entry of the vehicle telematics unit into a second virtual geographic area comprising a second MDDNS;
   registering the IP address assigned to the vehicle telematics unit with the second MDDNS; and
   receiving at the vehicle telematics unit one or more IP addresses assigned to other vehicle telematics units in the second MDDNS.

19. The method of claim 11, further comprising the step of receiving the geographic attribute at the central facility along with the IP address assigned to the vehicle telematics unit.

20. A method of anonymously resolving Internet Protocol (IP) addresses using a distributed network, comprising the steps of:

(a) receiving an IP address at a vehicle via a wireless carrier system;
(b) determining the location of the vehicle;
(c) identifying a first virtual geographic area comprising a micro dynamic domain name server (MDDNS) based on the determined location of the vehicle;
(d) registering the received IP address with the MDDNS;
(e) receiving at the vehicle one or more IP addresses assigned to other vehicles in the MDDNS;
(f) detecting the departure of the vehicle from the first virtual geographic area and the entry of the vehicle into a second virtual geographic area comprising a second MDDNS;
(g) registering the received IP address with the second MDDNS; and
(h) receiving at the vehicle one or more IP addresses assigned to other vehicles in the second MDDNS;
(f) detecting the departure of the vehicle from the first virtual geographic area and the entry of the vehicle into a second virtual geographic area comprising a second MDDNS;
(g) registering the received IP address with the second MDDNS; and
(h) receiving at the vehicle one or more IP addresses assigned to other vehicles in the second MDDNS.

* * * * *